Patented Aug. 23, 1927.

1,640,224

UNITED STATES PATENT OFFICE.

HERBERT WILLIAM ROBINSON, OF WEST BROMWICH, ENGLAND.

MANUFACTURE OF MATCH-STRIKING COMPOSITIONS.

No Drawing. Application filed February 18, 1926, Serial No. 89,223, and in Great Britain February 4, 1926.

This invention relates to match-striking compositions and its object is to simplify and cheapen the manufacture of compositions adapted to be used both for striking ordinary matches requiring only friction to ignite them and also for safety matches. Match-striking compositions have been already made in the solid form consisting of ingredients such as are generally employed in such compositions intimately mixed with a powdered condensate gum or synthetic resin and solidified by the application of pressure to the mixture while enclosed in heated moulds. The process for making such compositions has always involved the compressing of the material in a mould for a long time generally amounting to some hours at a relatively high pressure and it is not an easy matter to obtain a perfect mixture of the condensate gum with particles of the powdered ingredients.

In order to simplify the manufacture, according to the present invention the ingredients usually employed, consisting of red phosphorus, antimony sulphide together with a small amount of an abrasive material, are mixed with the materials for the production of the synthetic resin. For example, the said ingredients may be mixed with cresylic acid and formaldehyde, or paraformaldehyde, and an exciter or condensing agent such as hexamethylenetetramine and the condensation process to form the gum or resin is carried out in a steam-jacketed autoclave, for example, at a temperature of 135 degrees C. The pressure in this autoclave need not be considerable, but just sufficient to prevent the bubbling in the material from being violent and the time of manufacture is much reduced, being in fact not more than two hours and a perfect mixture of the synthetic resin with the other ingredients is obtained. Also such temperatures and pressures as are necessary in the autoclave give no risk of alteration of the amorphous phosphorus to the dangerous yellow form.

In order that the invention may be clearly understood and readily carried into effect, some examples of the new method of preparation will now be described in greater detail. As regards the proportions of the ingredients, these may be substantially the same as already employed in solid match-striking compositions containing these synthetic resins, but according to one example 4 gallons of cresylic acid mixed with 4½ lbs. of hexamethylenetetramine has stirred into it the following powdered mixture. The mixture consists of 15 lbs. of paraformaldehyde for forming the condensation product, 27 lbs. of red phosphorus, 13 lbs. of black antimony sulphide, 30 lbs. of slate dust introduced mainly as a filling material to prevent liability to ignition of the composition itself, 20 lbs. of emery fine enough to pass a 50-mesh sieve, 10 lbs. of ground glass fine enough to pass a 50-mesh sieve and 7 lbs. of precipitated chalk. The emery and ground glass, of course, form the abrasive constituent and the precipitated chalk is merely to neutralize any small traces of acid that may be present. The material is stirred in in the cold and forms a paste which can readily be shaped by means of a trowel. It may be placed in moulds of glass, for example, which may be of any shape, for example, to form a rectangular block of the material or to form a hollow cone for placing on the top of ash trays and similar devices. The paste in the moulds is placed in an autoclave sealed so as to be placed under sufficient pressure to prevent violent bubbling of the material during the condensation process and by means of a steam jacket the temperature within the autoclave is maintained at about 135 degrees C. This temperature is somewhat critical as the condensation action does not take place easily below 130 degrees C. and it is desirable to keep the temperature as low as possible to prevent any change in the red phosphorus. After the material has been maintained at this temperature in the autoclave for about two hours, the condensation process has been completed and after cooling, the material is ready for use. It is clear that the process is rapid and simple and therefore inexpensive.

The invention is not, of course, limited to the particular proportions given in the above example, nor is it limited to the use of the particular materials for producing the synthetic resin which have been referred to. For example, formaldehyde may be employed instead of paraformaldehyde and any other form of phenol as well as any approved exciter.

Having thus described my invention, what I claim as new and desire to secure by Letters Patent is:—

1. A process for the production of a non-inflammable composition upon which matches may be ignited by friction which consists in mixing together materials for the production of a synthetic resin together with ingredients usually employed in compositions upon which matches may be struck and subsequently subjecting the mixture to a condensation process to form a solid mass.

2. A process for the production of a non-inflammable composition upon which matches may be ignited by friction which consists in mixing together the materials for the production of a synthetic resin with ingredients usually employed in compositions upon which matches may be struck and subsequently condensing said materials by steam heating under moderate pressure.

3. A process for the production of a non-inflammable composition upon which matches may be ignited by friction which consists in stirring red phosphorus, an abrasive material and an aldehyde into a phenol together with a condensing agent so as to form a paste, moulding said paste to a desired shape and subjecting the resultant mass to a condensation process under moderate pressure.

4. A process for the production of a non-inflammable composition upon which safety matches may be struck which consists in stirring a mixture of red phosphorus, antimony sulphide, an abrasive material and paraformaldehyde into cresylic acid containing a condensing agent to form a moist paste, moulding said paste to a desired shape and steam heating the resultant mass to a temperature exceeding 100° C. under moderate pressure.

In witness whereof I hereunto subscribe my name this 8th day of February, 1926.

HERBERT WILLIAM ROBINSON.